United States Patent
Yao

(10) Patent No.: US 10,195,495 B2
(45) Date of Patent: Feb. 5, 2019

(54) PROCESS FOR MANUFACTURING A NON-DEGUMMING SEAMLESS AND SURFACE-LAMINATED BASKETBALL

(71) Applicant: Junwei Yao, Jiangsu (CN)

(72) Inventor: Junwei Yao, Jiangsu (CN)

(73) Assignee: Jiangsu Tianling Sporting Goods Co., Ltd., P.R. (CN)

(*) Notice: Subject to any disclaimer, the term of this patent is extended or adjusted under 35 U.S.C. 154(b) by 0 days.

(21) Appl. No.: 15/675,759

(22) Filed: Oct. 12, 2017

(65) Prior Publication Data

US 2018/0147456 A1 May 31, 2018

(30) Foreign Application Priority Data

Nov. 29, 2016 (CN) .......................... 2016 1 1073215

(51) Int. Cl.

| | |
|---|---|
| *B32B 41/00* | (2006.01) |
| *A63B 45/00* | (2006.01) |
| *A63B 41/02* | (2006.01) |
| *A63B 41/08* | (2006.01) |
| *B29C 33/42* | (2006.01) |
| *B29C 63/24* | (2006.01) |
| *B29C 65/48* | (2006.01) |
| *B29C 65/00* | (2006.01) |
| *B29C 69/00* | (2006.01) |
| *C08L 21/00* | (2006.01) |
| *B29C 44/06* | (2006.01) |
| *B29D 22/04* | (2006.01) |
| *B29C 35/04* | (2006.01) |
| *B29C 35/12* | (2006.01) |
| *B29K 75/00* | (2006.01) |
| *B29L 31/54* | (2006.01) |
| *B29K 105/00* | (2006.01) |
| *B29C 44/08* | (2006.01) |
| *B29L 9/00* | (2006.01) |
| *B29K 105/24* | (2006.01) |

(52) U.S. Cl.
CPC .............. *A63B 45/00* (2013.01); *A63B 41/02* (2013.01); *A63B 41/08* (2013.01); *B29C 33/42* (2013.01); *B29C 44/06* (2013.01); *B29C 63/24* (2013.01); *B29C 65/48* (2013.01); *B29C 66/7392* (2013.01); *B29C 69/001* (2013.01); *B29D 22/04* (2013.01); *C08L 21/00* (2013.01); *A63B 2209/00* (2013.01); *B29C 35/049* (2013.01); *B29C 35/12* (2013.01); *B29C 44/08* (2013.01); *B29K 2075/00* (2013.01); *B29K 2105/0005* (2013.01); *B29K 2105/24* (2013.01); *B29L 2009/00* (2013.01); *B29L 2031/54* (2013.01); *C08L 2205/02* (2013.01)

(58) Field of Classification Search
CPC ......... A63B 45/00; A63B 41/08; A63B 41/02; A63B 2209/00; B29D 22/04; B29C 44/06; B29C 69/001; B29C 65/48; B29C 33/24; B29C 66/7392; B29C 44/08; B29C 35/12; B29C 35/049; C08L 21/00; C08L 2205/02; B29K 2105/24; B29K 2105/0005; B29K 2075/00; B29L 2009/00; B29L 2031/54
USPC .......... 156/64, 350, 351, 368, 369, 378, 379
See application file for complete search history.

(56) References Cited

U.S. PATENT DOCUMENTS

| | | | |
|---|---|---|---|
| 2004/0186213 A1* | 9/2004 | Sandusky | A63B 39/00 524/445 |
| 2008/0188334 A1* | 8/2008 | Feeney | A63B 41/08 473/605 |

\* cited by examiner

*Primary Examiner* — Michael N Orlando
*Assistant Examiner* — Joshel Rivera

(57) ABSTRACT

A process for manufacturing a non-degumming, seamless and surface-laminated basketball, comprising the steps of: step 1: wrapping the inner bladder by threads, thereby shaping the carcass; step 2: preparing the uncured foamed middle bladder; step 3: preparing the half-finished PU surface-laminated ball; step 4: placing the half-finished leather ball obtained from step 3 into a curing mold; subsequently, curing under low temperature and low pressure via the thermal cross-linking method, thereby forming the cured PU foamed basketball; Step 5: testing the air-holding performance of the PU foamed basketball being cured under a low temperature and mounting the air nozzle, thereby obtaining the finished basketball; by means of the present invention, the prior curing process of the middle bladder and related downstream process can be saved.

3 Claims, No Drawings

PROCESS FOR MANUFACTURING A NON-DEGUMMING SEAMLESS AND SURFACE-LAMINATED BASKETBALL

TECHNICAL FIELD OF THE INVENTION

The present invention relates to the technical field of manufacturing basketballs, and more particularly, to a process for manufacturing a non-degumming, seamless and surface-laminated basketball.

BACKGROUND OF THE INVENTION

Today, many people prioritize exercise in their daily routine to stay healthy. As a major sport, basketball attracts a large number of people from high school to the professional level. There are increased requirements in the manufacture of basketballs: first, the process for manufacturing the balls must meet higher environmental protection standards, meaning that harmful solvents, especially benzene-containing organic solvents, are strictly prohibited from being used in the manufacturing process; second, facing fierce competition of labor cost and material cost, leather basketballs must be sold at a more competitive price; third, the market demands a higher quality and performance of the balls, meaning that the synthetic leather bonded to the middle bladder is not allowed to be degummed or edge-warped, and seams existed between the synthetic leather and the rubber string channels are unacceptable.

In the prior art, the basic process for manufacturing a leather basketball comprises the preparing processes of the middle-bladder and the panels. The preparation of the middle bladder further comprises the steps of: rubber mixing, sheeting, die-cutting, thread-wrapping, panel bonding, middle-bladder curing, finished middle-bladder trimming and storing. After bonding the eight panels onto the middle bladder and subsequently curing them, a finished middle bladder can be achieved. However, a large amount of steam and electric energy are consumed during this process, approximately increasing the cost by 0.55 CNY/pcs. Furthermore, the labor cost is increased by 0.2 CNY/pcs due to such a labor-intensive process. Meanwhile, the panels need to be processed by the steps of cutting, logo-printing, edge-skiving, adhesive-coating, heat shaping, air-nozzle mounting, air-inflating, pressure-specifying and panel-bonding. The edge-skiving, adhesive-coating and middle-bladder trimming are manually operated, sharply increasing the labor cost by 1.00 CNY/pcs. Meanwhile, the adhesive coated on the middle bladder further increases the cost by 0.8 CNY/pcs. A certain amount of solvent mixed with the adhesive can easily evaporate to cause air pollution, which is harmful to the operators' health. Consequently, the traditional process is not eco-friendly. The quality of the adhesive, the stability of manually coating the adhesive and trimming the middle bladder can directly determine the stability of the bonding strength between the synthetic leather and the middle bladder. Thus, problems relating to degumming and edge-warping can easily occur during use, seriously affecting the stability and performance of the basketballs. Additionally, the seams existing between the synthetic leather and the rubber string channels cannot be eliminated by such a traditional process. Thus, the basketballs can merely be shipped with an inflated inner bladder, further increasing the transportation cost due to the enlarged volume.

In conclusion, the shortcomings of traditional process for manufacturing a leather basketball are urgent problems that need to be solved for those skilled in this field.

SUMMARY OF THE INVENTION

The purpose of the present invention is to solve the shortcomings in the prior art and provide a simple, reasonable and convenient process for manufacturing a non-degumming, seamless and surface-laminated basketball, in which the prior curing process of the middle bladder and related downstream process can be saved. After being laminated together, the synthetic leather and the uncured rubber middle bladder are cured under low temperature and low pressure via the thermal cross-linking method. Thus, all of the parts including the synthetic leather, the foamed middle bladder rubber sheet layer, the fabric layer and the inner bladder are pressed together to provide a tight bond, thoroughly preventing the edges from being warped. Meanwhile, the synthetic leather and the string channel of the foamed middle bladder can be seamlessly connected. This process is simple, convenient, time-saving, cost-effective and energy-efficient.

To achieve the above purpose, the present invention adopts the following technical solution:

The process for manufacturing a non-degumming, seamless and surface-laminated basketball, comprising the steps of:

Step 1: wrapping the inner bladder by threads, thereby shaping the carcass;

Step 2: preparing the uncured foamed middle bladder:
1) preparing the rubber compound:
  a) preparing the rubber compound consisting of the following components in percent by weight: 20-80% of standard rubber, 10-30% of synthetic rubber, 5-10% of carbon master-batch, 5-10% of magnesium carbonate, 5-10% of silicon dioxide powder, 15-50% of light calcium carbonate, 3-8% of white factice, 5-10% of oil, 5-10% of zinc oxide powder, 2-3.5% of stearic acid, 1.5-2.5% of anti-aging agent, 0.5-1% of a first antioxidant wax, 0.5-1% of a second antioxidant wax, 1-3% of anti-fogging wax, 5-10% of foaming agent, 1-3% of synthetic resin, 5-10% of sulfur, 1-3% of a first accelerant, 1-3% of a second accelerant and 1-3% of a third accelerant;
  a) placing the rubber compound into a rubber mixing mill; subsequently, mixing the rubber compound in the mill;
2) cutting the rubber sheet obtained from step 1) into sections, and laminating the sheet sections onto the carcass obtained from step 1, thereby forming the uncured middle bladder in the laminating machine;

Step 3: preparing the half-finished PU surface-laminated ball:
1) cutting the PU leather into eight arc-shaped PU panels according to the surface design of the basketball;
2) printing patterns on the eight panels obtained from step 1);
3) coating rubber paste on the inner wall of the eight panels obtained from step 2);
4) the preparing process of the rubber paste used in step 3) comprises:
  a) preparing rubber compound A, which is composed of the following components in percent by weight: 70-90% of 3 L natural rubber, 3-7% of white carbon black, 4-8% of zinc oxide powder, 0.8-1.2% of stearic acid, 3-7% of phenolic resin and 1-5% of ZH-600 resin;

b) preparing rubber compound B, which is composed of the following components in percent by weight: 50-80% of 3 L natural rubber, 3-7% of white carbon black, 4-8% of zinc oxide powder, 0.8-1.2% of stearic acid, 3-7% of phenolic resin, 1-5% of ZH-600 resin, 6-10% of resorcinol and 1-3% of HMT-80 accelerant;

c) placing a same weight of rubber compound A, rubber compound B and rubber solvent into a bucket; subsequently, uniformly stirring for 24 hours to obtain the aforesaid rubber paste;

5) placing the eight PU panels coated with rubber paste obtained from step 4) into four cavities of a semispherical sub-mold and another four cavities of a semispherical master-mold; combining the semispherical sub-mode and the master-mold to form a spherical mold; subsequently, placing the uncured middle bladder into the spherical mold, and uniformly laminating the eight PU panels onto the surface of the uncured foamed middle bladder, thereby forming a half-finished leather ball;

Step 4: placing the half-finished leather ball obtained from step 3 into a curing mold; subsequently, curing under low temperature and low pressure via the thermal cross-linking method, thereby forming the cured PU foamed basketball;

Step 5: testing the air-holding performance of the PU foamed basketball being cured under a low temperature and mounting the air nozzle, thereby obtaining the finished basketball.

In another aspect of the present invention, the heat source utilized in the thermal cross-linking curing process is electric heating or steam.

In another aspect of the present invention, the curing mold can be provided with various mold textures, thereby forming various textures on the surface of the basketball.

Compared with the prior art, the present invention has the following advantages:

The present invention provides a simple, reasonable and convenient process for manufacturing a non-degumming, seamless and surface-laminated basketball, in which the prior curing process of the middle bladder and related downstream process can be saved. After being laminated together, the synthetic leather and the uncured rubber middle bladder are cured under low temperature and low pressure via the thermal cross-linking method. Thus, all of the parts including the synthetic leather, the foamed middle bladder rubber sheet layer, the fabric layer and the inner bladder are pressed together to provide a tight bond, thoroughly preventing the edges from being warped. Meanwhile, the synthetic leather and the string channel of the foamed middle bladder can be seamlessly connected, which is simple, convenient, time-saving, cost-effective and energy-efficient.

DETAILED DESCRIPTION OF THE INVENTION

Drawings and detailed embodiments are combined hereinafter to elaborate the technical principles of the present invention.

The process for manufacturing a non-degumming, seamless and surface-laminated PU foamed basketball, comprising the steps of:

Step 1: wrapping the inner bladder by threads, thereby shaping the carcass;

Step 2: preparing the uncured foamed middle bladder:
1) preparing the rubber compound:
a) preparing the rubber compound consisting of the following components in percent by weight: 20-80% of standard rubber, 10-30% of synthetic rubber, 5-10% of carbon master-batch, 5-10% of magnesium carbonate, 5-10% of silicon dioxide powder, 15-50% of light calcium carbonate, 3-8% of white factice, 5-10% of oil, 5-10% of zinc oxide powder, 2-3.5% of stearic acid, 1.5-2.5% of anti-aging agent, 0.5-1% of a first antioxidant wax, 0.5-1% of a second antioxidant wax, 1-3% of anti-fogging wax, 5-10% of foaming agent, 1-3% of synthetic resin, 5-10% of sulfur, 1-3% of a first accelerant, 1-3% of a second accelerant and 1-3% of a third accelerant;

b) placing the rubber compound into a rubber mixing mill; subsequently, mixing the rubber compound in the mill;

2) cutting the rubber sheet obtained from step 1) into sections, and laminating the sheet sections onto the carcass obtained from step 1, thereby forming the uncured middle bladder in the laminating machine;

Step 3: preparing the half-finished PU surface-laminated ball:
1) cutting the PU leather into eight arc-shaped PU panels according to the surface design of the basketball;
2) printing patterns on the eight panels obtained from step 1);
3) coating rubber paste on the inner wall of the eight panels obtained from step 2);
4) the preparing process of the rubber paste used in step 3) comprises:
a) preparing rubber compound A, which is composed of the following components in percent by weight: 70-90% of 3 L natural rubber, 3-7% of white carbon black, 4-8% of zinc oxide powder, 0.8-1.2% of stearic acid, 3-7% of phenolic resin and 1-5% of ZH-600 resin;
b) preparing rubber compound B, which is composed of the following components in percent by weight: 50-80% of 3 L natural rubber, 3-7% of white carbon black, 4-8% of zinc oxide powder, 0.8-1.2% of stearic acid, 3-7% of phenolic resin, 1-5% of ZH-600 resin, 6-10% of resorcinol and 1-3% of HMT-80 accelerant;
c) placing a same weight of rubber compound A, rubber compound B and rubber solvent into a bucket; subsequently, uniformly stirring for 24 hours to obtain the aforesaid rubber paste;

5) placing the eight PU panels coated with rubber paste obtained from step 4) into four cavities of a semispherical sub-mold and another four cavities of a semispherical master-mold; combining the semispherical sub-mode and the master-mold to form a spherical mold; subsequently, placing the uncured middle bladder into the spherical mold, and uniformly laminating the eight PU panels onto the surface of the uncured foamed middle bladder, thereby forming a half-finished leather ball;

Step 4: placing the half-finished leather ball obtained from step 3 into a curing mold; subsequently, curing under low temperature and low pressure via the thermal cross-linking method, thereby forming the cured PU foamed basketball;

Step 5: testing the air-holding performance of the PU foamed basketball being cured under a low temperature and mounting the air nozzle, thereby obtaining the finished basketball.

In another aspect of the present invention, the heat source utilized in the thermal cross-linking curing process is electric heating or steam.

In another aspect of the present invention, the curing mold can be provided with various mold textures, thereby forming various textures on the surface of the basketball.

In the present invention, the surface of the basketball is designed to be an eight-paneled pattern. Obviously, it can also be configured into four-paneled, six-paneled, ten-paneled or twelve-paneled, etc. The corresponding mold can be provided with corresponding quantity of mold cavities according to the surface design for conveniently manufacturing the basketball.

In such a design, the material of the basketball surface can be divided into rubber and PU. In the process for manufacturing a basketball, the first step is to shape the carcass, namely, wrapping the inner bladder by threads to form the carcass.

Subsequently, a half-finished rubber basketball is prepared by the following steps: rubber mixing, sheeting, cutting, and laminating the rubber sheet onto the surface of the carcass.

Similarly, a half-finished PU basketball is prepared by the following steps: cutting PU leather, printing patterns on the surface of PU panels, coating rubber paste onto the inner wall of the panels, and laminating the PU panels onto the carcass.

Finally, the half-finished rubber ball or PU ball are placed into a curing mold for a thermal cross-linking curing process. After testing the air-holding performance and mounting the air nozzle, the finished basketballs are packed in bulk for distribution to retailers.

Compared with the prior art, the present invention has the following advantages:

First, in the process of the present invention, those traditional steps (middle bladder curing, air inflating, pressure specifying and air-leakage testing) for manufacturing a basketball can be saved. Thus, the following costs can be saved by means of the present invention:

a) the labor cost is saved by 0.25 CNY/pcs;

b) cost of steam and electricity consumption is saved by 0.55 CNY/pcs; meanwhile, a certain cost of storing the middle bladders can be saved;

Second, the present invention greatly simplifies the following steps: middle bladder trimming, adhesive coating and edge skiving, leading to great benefits in below:

a) the labor cost can be saved by 1.00 CNY/pcs;

b) the material cost can be saved by 1.50 CNY/pcs;

c) the evaporation of organic solvents can be effectively reduced due to less consumption of adhesive, decreasing the air pollution in the workshop and protecting the operators' health in a certain degree.

Third, the present invention adopts a standard mold for cutting knives, through which the cutting size of the synthetic leather can be accurately determined; furthermore, the panels can be precisely located through the standard positioned mold cavities.

In addition to the above, the present invention has the following benefits:

a) it's unnecessary to separately cure the half-finished middle bladder into a finished middle bladder; meanwhile, trimming and storing the middle bladder are no longer needed;

b) processes such as middle bladder skiving, adhesive coating and edge skiving can be saved;

c) the panels are positioned in mold and laminated by machine instead of being manually operated;

d) the textures printed on the surface of the basketball can be varied according to requirements at a low cost;

e) the finished products can be shipped after being half-deflated, significantly decreasing the volume and saving the transportation cost;

f) the finished products are seamless and non-degumming, effectively preventing the edges from being warped; the foamed middle bladder has excellent impact-resistance, balance and bouncing performance, providing the users a perfect hand feeling.

The impact-test results are shown in the following table:

| Number of times | Circumference 1 | Circumference 2 | Circumference 3 | Bounce | Remarks |
| --- | --- | --- | --- | --- | --- |
| 0 | 753 | 753 | 753 | 55" | |
| 5000 | 755 | 754 | 754.5 | | −1 mm |
| 10000 | 755 | 755 | 754 | | −1 mm |

The testing results show that the appearance of the basketball is not damaged after being impacted for 10000 times.

The present invention provides a simple, reasonable and convenient process for manufacturing a non-degumming, seamless and surface-laminated basketball, in which the prior curing process of the middle bladder and related downstream process can be saved. After being laminated together, the synthetic leather and the uncured rubber middle bladder are cured under low temperature and low pressure via the thermal cross-linking method. Thus, all of the parts including the synthetic leather, the foamed middle bladder rubber sheet layer, the fabric layer and the inner bladder are pressed together to provide a tight bond, thoroughly preventing the edges from being warped. Meanwhile, the synthetic leather and the string channel of the foamed middle bladder can be seamlessly connected, which is simple, convenient, time-saving, cost-effective and energy-efficient.

The previous descriptions are of preferred examples for implementing the invention, and the scope of the invention should not necessarily be limited by this description. The scope of the present invention is defined by the claims.

The invention claimed is:

1. The process for manufacturing a non-degumming, seamless and surface-laminated basketball, comprising the steps of:

Step 1: wrapping the inner bladder by threads, thereby shaping the carcass;

Step 2: preparing the uncured foamed middle bladder:

1) preparing the rubber compound:

a) preparing the rubber compound consisting of the following components in percent by weight: 20-80% of standard rubber, 10-30% of synthetic rubber, 5-10% of carbon master-batch, 5-10% of magnesium carbonate, 5-10% of silicon dioxide powder, 15-50% of light calcium carbonate, 3-8% of white factice, 5-10% of oil, 5-10% of zinc oxide powder, 2-3.5% of stearic acid, 1.5-2.5% of anti-aging agent, 0.5-1% of a first antioxidant wax, 0.5-1% of a second antioxidant wax, 1-3% of anti-fogging wax, 5-10% of foaming agent, 1-3% of synthetic resin, 5-10% of sulfur, 1-3% of a first accelerant, 1-3% of a second accelerant and 1-3% of a third accelerant;

b) placing the rubber compound into a rubber mixing mill; subsequently, mixing the rubber compound in the mill;

2) cutting the rubber sheet obtained from step 1) into sections, and laminating the sheet sections onto the carcass obtained from step 1, thereby forming the uncured middle bladder in the laminating machine;

Step 3: preparing the half-finished PU surface-laminated ball:

1) cutting the PU leather into eight arc-shaped PU panels according to the surface design of the basketball;

2) printing patterns on the eight panels obtained from step 1);

3) coating rubber paste on the inner wall of the eight panels obtained from step 2);

4) the preparing process of the rubber paste used in step 3) comprises:

a) preparing rubber compound A, which is composed of the following components in percent by weight: 70-90% of 3 L natural rubber, 3-7% of white carbon black, 4-8% of zinc oxide powder, 0.8-1.2% of stearic acid, 3-7% of phenolic resin and 1-5% of ZH-600 resin;

b) preparing rubber compound B, which is composed of the following components in percent by weight: 50-80% of 3 L natural rubber, 3-7% of white carbon black, 4-8% of zinc oxide powder, 0.8-1.2% of stearic acid, 3-7% of phenolic resin, 1-5% of ZH-600 resin, 6-10% of resorcinol and 1-3% of HMT-80 accelerant;

c) placing a same weight of rubber compound A, rubber compound B and rubber solvent into a bucket; subsequently, uniformly stirring for 24 hours to obtain the aforesaid rubber paste;

5) placing the eight PU panels coated with rubber paste obtained from step 4) into four cavities of a semispherical sub-mold and another four cavities of a semispherical master-mold; combining the semispherical sub-mode and the master-mold to form a spherical mold; subsequently, placing the uncured middle bladder into the spherical mold, and uniformly laminating the eight PU panels onto the surface of the uncured foamed middle bladder, thereby forming a half-finished leather ball;

Step 4: placing the half-finished leather ball obtained from step 3 into a curing mold; subsequently, curing under low temperature and low pressure via the thermal cross-linking method, thereby forming the cured PU foamed basketball;

Step 5: testing the air-holding performance of the PU foamed basketball being cured under a low temperature and mounting the air nozzle, thereby obtaining the finished basketball.

2. The process for manufacturing a non-degumming, seamless and surface-laminated basketball of claim 1, wherein the heat source utilized in the thermal cross-linking curing process is electric heating or steam.

3. The process for manufacturing a non-degumming, seamless and surface-laminated basketball of claim 1, wherein the curing mold can be provided with various mold textures, thereby forming various textures on the surface of the basketball.

* * * * *